Dec. 8, 1936.    U. LAMM    2,063,106

GRID CONTROL MEANS IN ION VALVE APPARATUS

Filed July 7, 1933    2 Sheets-Sheet 1

Inventor
Uno Lamm
By Wm Wallace White
Attorney.

Dec. 8, 1936.   U. LAMM   2,063,106
GRID CONTROL MEANS IN ION VALVE APPARATUS
Filed July 7, 1933   2 Sheets-Sheet 2

Inventor
Uno Lamm
By Wallace White
Attorney

Patented Dec. 8, 1936

2,063,106

UNITED STATES PATENT OFFICE 2,063,106

GRID CONTROL MEANS IN ION VALVE APPARATUS

Uno Lamm, Ludvika, Sweden, assignor to Allmänna Svenska Elektriska Aktiebolaget, Vasteras, Sweden, a corporation of Sweden Application July 7, 1933, Serial No. 679,344
In Sweden July 9, 1932

5 Claims. (Cl. 175—363)

In ion valves having grid control, either for voltage regulation or for other purposes, the control grid voltages have always been taken from some apparatus in metallic contact with the main circuits of the apparatus. It has, however, been found that this is not necessary since an anode temporarily burning always keeps its own grid at a potential lying between narrow limits. For this reason, it is only necessary to connect the grids together and to introduce certain additional voltages between them in order to make each grid assume the control voltage needed for any particular case. The present invention relates to such an arrangement which offers several advantages. First, the grid potential can practically never become so strongly positive, that the grid can act as an anode, which is of importance for preventing back-arcing. Second, the current demand and/or power demand of the grid circuits will be less than with the methods hitherto employed.

Figure 2:
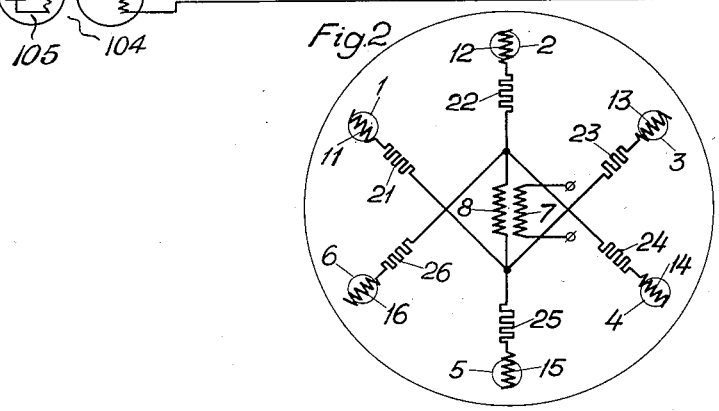
Figure 3:
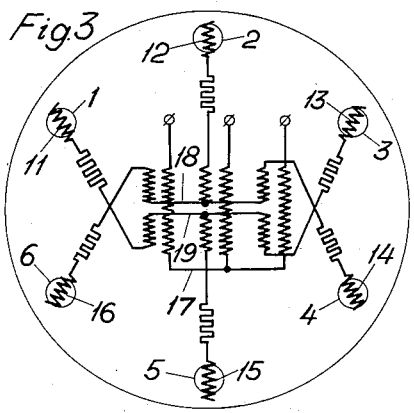
Figure 4:
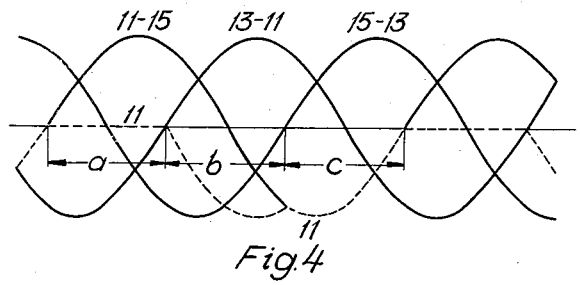

Some forms of the invention are diagrammatically illustrated in the accompanying drawings in Figs. 1–3, 5 and 6, while Fig. 4 shows a corresponding voltage diagram.

In Fig. 1, 1–6 designate the six anodes of a polyphase ion valve and 11–16 the corresponding grids. Between the grids, there are connected resistances 21–26 and a corresponding number of secondary windings of a single-phase transformer, on the primary winding 7 of which is impressed a voltage of a frequency three times that of the primary load current. The phase angle of said single-phase voltage should be capable of regulation at will. The secondary windings 31–36 are ring-connected, alternatingly in opposite senses, as the diagram shows. The resistances between the grids should be essentially smaller than the resistances in the current paths between the grids and the load circuit through non-operative anodes and cathode. Preferably, there should be no other connection between the grids and load circuit than through the gaseous paths.

If the ion valve is for instance assumed to operate as a usual six-phase rectifier, the mode of operation will be substantially the following: When for instance the anode 1 is burning, its grid 11 will assume a potential of some tens of volts above that of the cathode. The anode 2, which is in turn to be ignited next, can obviously not be so ignited before its grid 12 has obtained a sufficiently positive voltage with respect to the grid 11 by means of the transformer winding 32. The instant therefore can be regulated by adjusting the phase angle of the voltage impressed on the transformer winding 7. In the same manner the instants of ignition of all the other anodes can be regulated and thereby the voltage delivered by the rectifier.

For the regulation in phase of the grid potential there is provided a transformer having a three phase primary winding 101, and a six phase secondary winding 102 which latter feeds the anodes 1 to 6. Between two terminals of the winding 101, there is connected a frequency and phase converter consisting of a synchronous motor 103 and a synchronous generator 104 having a rotatable stator 105. This generator 104 feeds to the winding 7 a voltage of the appropriate frequency capable of regulation in phase. Similar phase regulating means may also be applied to the forms shown at Figs. 2, 3, 5 and 6 of the drawings.

Figure 1:
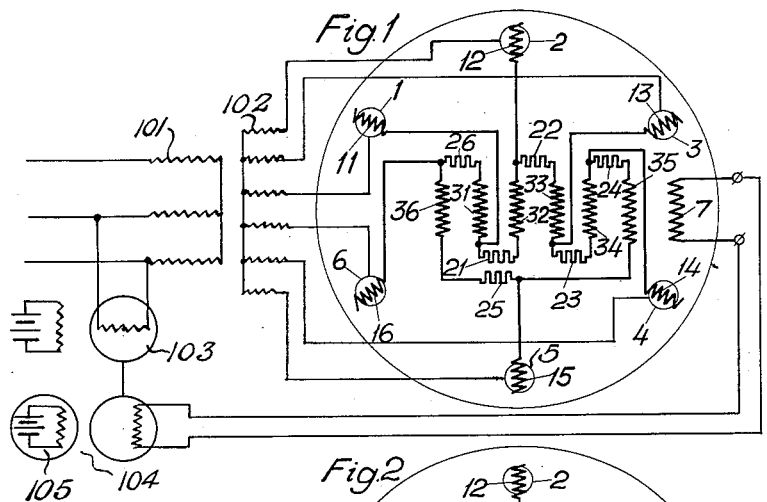

Fig. 2 shows a simplified modification of Fig. 1. The anodes, grids, and resistances in the grid circuit are designated in a corresponding manner. The transformer for impressing the additional voltages has, however, in this case only one secondary winding 8, one terminal of which is connected to the anode grids 11, 13, 15 and the other to the grids 12, 14, 16. In the same way as already described it is here found that when for instance an odd anode shall be succeeded by an even one, the latter cannot ignite until the additional voltage from the winding 8 has risen to a certain positive value.

Fig. 3 shows a connection of the grid circuits which is particularly adapted for a rectifier consisting of two halves connected together over a voltage divider (section transformer). The one half is assumed to embrace the anodes having odd numbers and the other those with even numbers. In an analogous manner, the corresponding anode grids are connected together in two groups, the odd numbers to a threephase Y-connected transformer winding 19 and the even numbers to a similar winding 18. The two transformer windings are directed in opposite senses and cooperate with a common primary winding 17 on which a threephase voltage of the same frequency as the working voltage is impressed. The manner of operation is illustrated in Fig. 4. The uniformly sine-shaped curves represent here the potential differences between two consecutive grids 11—15, 13—11, 15—13 of one threephase group. These potential differences are directly determined by the transformer winding 19 and are thus regular threephase voltages. The dotted irregular curve designates the potential on a certain grid 11 which is determined partly by the aforesaid differences partly by the fact that the grid during the working interval of its own anode obtains practically the cathode potential (considered as zero). During the first third part of a cycle a, when the anode 1 burns, the grid 11 has thus zero potential. During the second third part b, when the anode 3 burns, the potential of the grid 11 is determined by the voltage 13—11 bearing in mind that the grid 13 has zero potential. During the last third part, the potential of the grid 11 is determined by the voltage 11—15, as the grid 15 has now zero potential. In the same way the potential of the other grids will vary so as to always become safely negative during the periods when each grid is intended to block the current.

Figure 5:
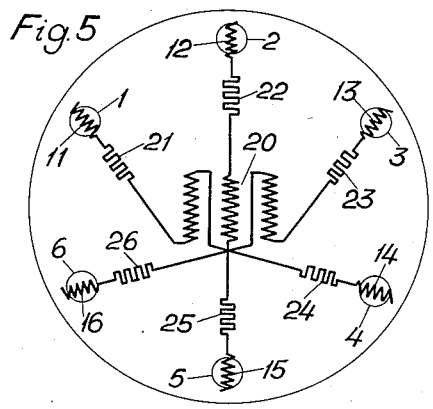
Figure 6:
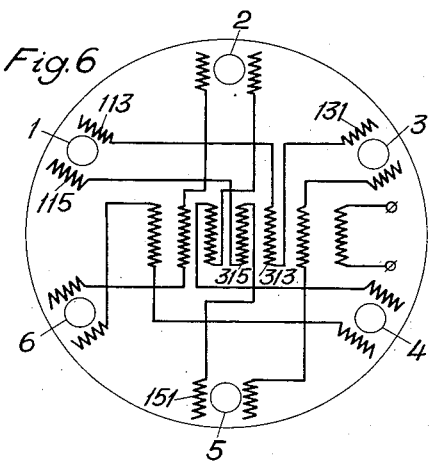

Fig. 5 shows a form substantially analogous to Fig. 3, in which six anodes 1–6 are divided into three single-phase groups the neutral points of which are assumed to be connected together by a threephase current divider. The three secondary windings of a primarily three-phase transformer 20 are connected between the anode grids.

If it is attempted to apply the principle illustrated in Fig. 1, using a single-phase additional voltage of the threefold frequency, on anodes connected in threephase, it is found that this cannot be done in the simple way illustrated in Fig. 1, because the secondary winding of the additional transformer would then be delta-connected and would carry equalizing currents which would disturb the result. The arrangement according to Fig. 6 could therefore be used. Here each anode has two grids, for instance the anode 1 has two grids 113 and 115 which over windings 313, 315 of a single-phase transformer having primary winding 7 are connected to the corresponding grid 131 and 151 of the anodes 3 and 5, respectively. Only one of the grids of each anode, which is connected to the corresponding grid of the occasionally burning anode, then determines the blocking voltage, while the other grid adapts its potential to that of the first one.

I claim as my invention:—

1. In ion valves, a cathode, a plurality of anodes, control grids for said anodes, in contact with the gaseous current paths between said anodes and cathode, and means interconnecting said grids and capable of introducing a potential difference therebetween capable of regulation in phase and determining essentially the potential of the grids belonging to occasionally non-active anodes, no effective metallic or other solid electrical connection being provided between said grids and said anodes or cathode.

2. In ion valves, a cathode, a plurality of anodes, control grids for said anodes, in contact with the gaseous current paths between said anodes and cathode, connections between said grids containing essentially less resistance than the current paths by which the grids may be connected with the circuits through non-operative anodes and cathode, and means for introducing additional voltages capable of regulation in phase in said connections, no effective metallic or other solid electrical connection being provided between said grids and said anodes or cathode.

3. In ion valves, a cathode, a plurality of anodes, means for impressing a polyphase voltage on said anodes, in contact with the gaseous current paths between said anodes and cathode, control grids for said anodes, and means for impressing between said grids a voltage capable of regulation in phase and varying with a frequency corresponding to the product of the anode frequency and phase number divided by 2, no effective metallic or other solid electrical connection being provided between said grids and said anodes or cathode.

4. In ion valves, a cathode, a plurality of anodes, means for impressing a polyphase voltage on said anodes, control grids for said anodes in conducting relation to the gaseous current paths between said anodes and cathode, and means for impressing between said grids a voltage capable of regulation in phase and having the product of the number of phases and the frequency equal to the product of the number of phases and the frequency of the polyphase voltage impressed on said anodes, no effective metallic or other solid electrical connection being provided between said grids and said anodes or cathode.

5. In ion valves, a cathode, a plurality of anodes, a plurality of interconnected polyphase voltage sources connected to said anodes so as to cause overlapping of the active periods of said anodes, control grids for said anodes in conducting relation to the gaseous current paths between said anodes and cathode, and a number of independent polyphase voltage sources equal to the number of said interconnected voltage sources and of equal phase number and serving to impress voltages capable of regulation in phase between said control grids, no effective metallic or other solid electrical connection being provided between said grids and said anodes or cathode.

UNO LAMM.